United States Patent
Li et al.

(10) Patent No.: US 6,324,209 B1
(45) Date of Patent: Nov. 27, 2001

(54) MULTI-CHANNEL SPREAD SPECTRUM SYSTEM

(75) Inventors: Don Li, Morganville; Gang Yang, Eatontown, both of NJ (US)

(73) Assignee: Golden Bridge Technology Inc., West Long Beach, NJ (US)

( * ) Notice: Subject to any disclaimer, the term of this patent is extended or adjusted under 35 U.S.C. 154(b) by 0 days.

(21) Appl. No.: 09/570,393

(22) Filed: May 12, 2000

Related U.S. Application Data

(60) Provisional application No. 60/185,369, filed on Feb. 28, 2000.

(51) Int. Cl.[7] .................................................. H04K 1/00
(52) U.S. Cl. ........................... 375/146; 375/140; 375/308
(58) Field of Search .................................... 375/130, 133, 375/140, 141, 146, 260, 295, 308, 279, 280; 370/208, 320, 321, 335, 336, 342, 345, 347, 441, 442

(56) References Cited

U.S. PATENT DOCUMENTS

| | | | |
|---|---|---|---|
| 3,934,203 | 1/1976 | Schiff | 375/343 |
| 4,222,115 | 9/1980 | Cooper et al. | 375/130 |
| 4,291,410 | 9/1981 | Caples et al. | 375/345 |
| 4,418,393 | 11/1983 | Zscheile, Jr. | 708/314 |
| 4,418,425 | 11/1983 | Fennel, Jr. et al. | 380/33 |
| 4,481,640 | 11/1984 | Chow et al. | 375/143 |
| 4,506,372 | 3/1985 | Massey et al. | 375/366 |
| 4,587,662 | 5/1986 | Langewellpott | 375/138 |
| 4,601,047 | 7/1986 | Horwitz et al. | 370/479 |

(List continued on next page.)

OTHER PUBLICATIONS

John G. Proakis, "Digital Communications", 3rd Edition, Aug. 1996, McGraw–Hill, Inc., pp 680–686.

Robert C. Dixon, "Spread Spectrum Systems," 2nd Edition, 1984, John Wiley & Sons, pp. 403–405.

Herbert Taub et al., "Principles of Communications Systems", 2nd Edition, 1971, McGraw–Hill, Inc., pp. 732–737.

Nirode C. Mohanty, "Spread Spectrum and Time Division Multiple Access Satellite Communications", *IEEE Transactions on Communications*, vol. Com–25, No. 8 (Aug. 1977), pp. 810–815.

Robert Gold, correspondence entitled "Optimal Binary Sequences for Spread Spectrum Multiplexing", *IEEE Transactions on Communications*, (Oct. 1967), pp. 619–621.

Marvin K. Simon et al., "Spread Spectrum Communications Handbook", 1994, McGraw–Hill, Inc., pp. 1108–1111.

Primary Examiner—Stephen Chin
Assistant Examiner—Chieh M. Fan
(74) Attorney, Agent, or Firm—McDermott, Will & Emery

(57) ABSTRACT

A multi-channel spread-spectrum system separates a data stream, for example from a convolutional encoder and an interleaver, into sub-channel data-sequence signals. For each sub-channel data-sequence signal, m bits are translated to one code of a unique set of orthogonal chip-sequence signals. The other k bits of the same sub-channel data-sequence signal are translated to a distinct phasor. Each phasor is used to modulate the respective chip-sequence signal. A complex-signal combiner combines the real and imaginary components of all the phase-modulated chip-sequence signals into in-phase (I) and quadrature (Q) spread-spectrum multi-channel signals, which are spread by a cell-site specific signature-sequence. The receiver decorrelates the received spread-spectrum signal, preferably with a bank of matched filter (MF) joint-detectors, to recover the bits from all the spread-spectrum sub-channel signals for remultiplexing into the transmitted data stream. The multi-channel spread-spectrum system supports constant data rate throughout the cell by maintaining a large processing gain, at the demultiplexed sub-channel data sequency level, thus a code-reuse-one type spread-spectrum system can be deployed with the aid of power control.

23 Claims, 7 Drawing Sheets

U.S. PATENT DOCUMENTS

| | | | |
|---|---|---|---|
| 4,606,039 | 8/1986 | Nicolas et al. | 375/142 |
| 4,612,637 | 9/1986 | Davis et al. | 370/348 |
| 4,691,326 | 9/1987 | Tsuchiya | 375/152 |
| 4,694,467 | 9/1987 | Mui | 375/144 |
| 4,707,839 | 11/1987 | Andren et al. | 375/150 |
| 4,736,371 | 4/1988 | Tejima et al. | 370/236 |
| 4,745,628 | 5/1988 | McDavid et al. | 375/261 |
| 4,759,034 | 7/1988 | Nagazumi | 375/142 |
| 4,774,715 | 9/1988 | Messenger | 375/149 |
| 4,912,722 | 3/1990 | Carlin | 375/146 |
| 4,918,689 | 4/1990 | Hui | 370/510 |
| 4,932,037 | 6/1990 | Simpson et al. | 375/147 |
| 4,984,247 | 1/1991 | Kaufmann et al. | 375/141 |
| 5,023,887 | 6/1991 | Takeuchi et al. | 375/130 |
| 5,166,951 * | 11/1992 | Schilling | 375/145 |
| 5,179,571 | 1/1993 | Schilling | 370/331 |
| 5,181,225 | 1/1993 | Neeser et al. | 375/350 |
| 5,210,771 | 5/1993 | Schaeffer et al. | 375/132 |
| 5,216,691 | 6/1993 | Kaufmann | 375/150 |
| 5,222,099 | 6/1993 | Hori et al. | 375/149 |
| 5,291,486 | 3/1994 | Koyanagi | 370/541 |
| 5,321,721 | 6/1994 | Yamaura et al. | 375/141 |
| 5,402,413 | 3/1995 | Dixon | 370/335 |
| 5,455,822 | 10/1995 | Dixon et al. | 370/342 |
| 5,461,639 | 10/1995 | Wheatley, III et al. | 370/342 |
| 5,504,776 | 4/1996 | Yamaura et al. | 375/141 |
| 5,566,164 | 10/1996 | Ohlson | 370/320 |
| 5,619,527 | 4/1997 | Kuroyanagi et al. | 375/147 |
| 5,648,982 | 7/1997 | Durrant et al. | 375/146 |
| 5,729,570 * | 3/1998 | Magill | 375/149 |
| 5,734,648 * | 3/1998 | Adachi et al. | 370/342 |
| 5,862,133 * | 1/1999 | Schilling | 370/342 |
| 6,016,255 | 1/2000 | Bolan et al. | 361/807 |
| 6,018,547 | 1/2000 | Arkhipkin et al. | 375/133 |
| 6,078,576 * | 6/2000 | Schilling et al. | 370/347 |

* cited by examiner

Code Mapping Rule:
94 m bits of $d_1(t)$ →
$$\left\{\begin{array}{l} C_1 = (C_{1,1}\ C_{1,2}\ C_{1,3}\ \cdots\ C_{1,n2}^m) \\ C_2 = (C_{2,1}\ C_{2,2}\ C_{2,3}\ \cdots\ C_{2,n2}^m) \end{array}\right.$$
95 m bits of $d_2(t)$ →
$$\left\{\begin{array}{l} C_2^m = (C_{2,1}^m\ C_{2,2}^m\ C_{2,3}^m\ \cdots\ C_{2,n2}^m) \\ C_{2+1}^m = (C_{2+1,1}^m\ C_{2+1,2}^m\ C_{2+1,3}^m\ \cdots\ C_{2+1,n2}^m) \\ C_{2+2}^m = (C_{2+2,1}^m\ C_{2+2,2}^m\ C_{2+2,3}^m\ \cdots\ C_{2+2,n2}^m) \\ \vdots \\ C_2^{m+1} = (C_{2,1}^{m+1}\ C_{2,2}^{m+1}\ C_{2,3}^{m+1}\ \cdots\ C_{2,n2}^{m+1}) \end{array}\right.$$
96

⋮ m bits of $d_n(t)$ →
$$\left\{\begin{array}{l} C_{(n-1)2+1}^m = (C_{(n-1)2+1,1}^m\ C_{(n-1)2+1,2}^m\ C_{(n-1)2+1,3}^m\ \cdots\ C_{(n-1)2+1,n2}^m) \\ C_{(n-1)2+2}^m = (C_{(n-1)2+2,1}^m\ C_{(n-1)2+2,2}^m\ C_{(n-1)2+2,3}^m\ \cdots\ C_{(n-1)2+2,n2}^m) \\ \vdots \\ C_{n2}^m = (C_{n2,1}^m\ C_{n2,2}^m\ C_{n2,3}^m\ \cdots\ C_{n2,n2}^m) \end{array}\right.$$
97

Fig. 5

MULTI-CHANNEL SPREAD SPECTRUM SYSTEM

RELATED APPLICATIONS

This application claim the benefit of U.S. Provisional Application No. 60/185,369, entitled "MULTI-CHANNEL SPREAD SPECTRUM SYSTEM" filed on Feb. 28, 2000, the disclosure of which is entirely incorporated herein by reference.

FIELD OF THE INVENTION

The concepts involved in the present invention relate to spread-spectrum communications system design, and more particularly to an efficient technique combining code-spreading and phase-modulation of multiple spread-spectrum sub-channels, to achieve a high capacity channel with large processing gain.

BACKGROUND

Mobile communication is becoming increasingly popular, at much the same time that more and more customers are asking for ever higher data-rate services. Increasingly, development efforts are focusing on techniques for high-capacity communication of digital information over wireless links.

Spread-spectrum is a method of modulation, like FM, that spreads a data signal for transmission over a bandwidth, which substantially exceeds the data transfer rate. Direct sequence spread-spectrum involves modulating a data signal with a pseudo-random chip sequence. The spread-spectrum signal is transmitted as a radio wave over a communications media to the receiver. The receiver despreads the signal to recover the information data. For a given bandwidth, processing gain and power level, a spread-spectrum communications system has a limited capacity for communicating information over a single channel.

A high processing gain means that for the information signal there is a high correlation at the receiver, creating a high signal to interference ratio. A low processing gain makes spread-spectrum communication more susceptible to interference such as from transmissions in neighboring cells.

A variant of direct sequence spread-spectrum communication involves mapping distinct information data streams to unique chip sequences. One technique for overcoming the problems relating to processing gain is disclosed in U.S. Pat. No. 5,862,133, entitled, PACKET-SWITCHED SPREAD-SPECTRUM SYSTEM, by D. L. Schilling. In the system disclosed in the '133 patent, a data stream input at a transmitter is demultiplexed into a plurality of sub-channel data-sequence signals. Each sub-channel data-sequence signal is spread-spectrum processed into a spread-spectrum signal. The spread-spectrum signals are combined and sent over a communications channel. At the receiver, the received signal is despread into the plurality of sub-channel data-sequence signals and multiplexed back to a stream of received data.

Consider the transmission of 56 Mbps data over 100 MHz wide radio frequency (RF) band, by way of an example. Processing gain at the spread level is the chip rate divided by the code rate before spreading. If data is demultiplexed onto I- and Q-channels and spread, then the processing gain at the demultiplexed channel level is around 5.5 dB. The typical advantages of spread-spectrum modulation are resistance to fading caused by multipath, immunity from inter-cell interference from spread-spectrum signals of neighboring systems. The low processing gains, however, result in channel degradation and reduce or eliminate the advantages normally associated with spread-spectrum modulation.

It may be helpful to consider an example of such a system in somewhat more detail, such as the system shown in FIG. 7. The illustrated system includes a transmitter communicating with a receiver via an air-link. The transmitter essentially includes the elements 71–75 shown in the drawing.

In the transmitter, the demultiplexer (DeMux) 71 receives the input data stream, for example at the 56 Mbps rate. The demultiplexer 71 essentially splits the data into two branches, one for the I-channel and one for the Q-channel. Here we are assuming four-bit wide sub-channel streams, therefore the demultiplexer 71 alternately sends four-bits to its I output and four-bits to its Q output, resulting in two separate 28 Mbps data sub-channel sequences.

Each sub-channel data sequence goes to an input of one of two code mapper circuits 72. Each code mapper 72 maps each four bits on its input to a distinct one of sixteen available code-spreading sequences. Each code sequence is sixteen chips long. Each mapper uses the same set of sixteen spreading codes.

A modulator 73 receives the code-spread output of the I-channel mapper. The modulator 73 multiplies the direct sequence spread spectrum by an RF oscillator signal $\cos(\omega_0 t)$ or carrier wave. Similarly, a modulator 74 receives the code-spread output of the Q-channel mapper. The modulator 73 multiplies the direct sequence spread spectrum by an RF oscillator signal $\sin(\omega_0 t)$. The two resultant modulated signals have the same frequency ($\omega_0$) but have a 90° phase difference. A summer 75 combines the two modulated RF signals from the modulators 73 and 74, and the combined signal is transmitted over the channel.

The channel is subject to a variety of different types of noise signals and interference effects. Theoretically, the transmission through the channel may be viewed as a summation 76 adding a noise signal n(t) to the broadcast spread spectrum signal from the summer 75.

The receiver essentially comprises the elements 77–82 shown to the right in FIG. 7. The noise corrupted signal from the channel 76 is applied to two multipliers 77, 78. The multiplier 77 multiplies the received signal by a local oscillator signal $\cos(\omega_0 t)$ to translate to a desired baseband. Similarly, the multiplier 74 multiplies the noise corrupted signal from the channel by a local oscillator signal $\sin(\omega_0 t)$ to translate to the baseband. The local oscillator signals essentially correspond to the signals used to modulate the two spread spectrum sub-channel sequences at the transmitter.

Each multiplier 77, 78 essentially outputs a signal containing the spreading codes plus the channel noise. Each of these output signals is applied to a matched filter (MF) 79. A matched filter includes reference signals, in this case corresponding to the sixteen spreading codes, and correlates the signal on its input to identify the most likely match (largest correlation value) and thereby selected the most probably transmitted code sequence. Each demapper 81 therefore outputs a bit stream corresponding to chip sequences recovered from the received carrier-modulated spread-spectrum signals.

Each matched-filter (MF) 79 supplies the recovered stream of chip sequences to a demapper 81. The demapper 81 maps each recovered chip sequence back to a four-bit data value. The output of one of the demappers 81 essentially corresponds to one of the sub-channel data streams at 28 Mbps. The two sub-channel data streams are input to a multiplexer (Mux) 82, which combines alternate four-bit chunks of data to form the output data stream at 56 Mbps.

While this type of spread-spectrum communication using sub-channels does achieve some improvement in processing gain at the demultiplexed sub-channel data sequence level, the improvement is somewhat limited by the available bandwidth. Absent more bandwidth, it is not possible to further increase processing gains with existing techniques. A need therefore exists for a technique achieving still higher processing gains, particularly within a given bandwidth, to allow interference-free transport of higher quantities of data over a given wireless channel bandwidth.

SUMMARY OF THE INVENTION

Hence a general objective of the invention is to achieve a multi-channel spread-spectrum system having a high processing gain, preferably at the demultiplexed sub-channel data sequence level, and having high spectral efficiency.

Another objective relates to use of phase modulation on the orthogonal chip-sequence, to increase system spectral efficiency.

The inventive concepts alleviate the above noted problems in spread-spectrum communications and achieve the stated objectives by using multi-channel transport in combination with code spreading and phase modulation of the individual code sequence signals, for each sub-channel. This provides high capacity while solving inter-cell interference problems. Certain aspects of the invention relate to a transmitter system, a method of transmitting information and a system for communicating information that includes both a transmitter and a receiver.

For example, a transmitter in accord with one as aspect of the present invention utilizes a demultiplexer or the like that divides the input data stream into a plurality of sub-channel data sequences. Circuitry maps bits of each sub-channel data sequence to unique code sequences having differing phases.

Preferably, for each sub-channel data-sequence signal, a code-map translates m bits to one code of a unique set of orthogonal chip-sequence signals. A phase-map uses the other k bits of the same sub-channel data-sequence signal to select one phasor from among a set of phasors. The selected phasor is used to modulate the respective chip-sequence signal from the corresponding code map circuit. The preferred system utilizes a unique set of phasors for phase modulation in each sub-channel, to reduce peak-to-average power ratio. The phase modulation provides bandwidth compression and thus more efficient use of available spectrum bandwidth. As a result, the inventive technique allows for a higher processing gain at the demultiplexed sub-channel data sequence level.

The phase-modulated chip sequence produced by the product of the outputs of one code map circuit and the corresponding phase map circuit forms the spread spectrum signal for one sub-channel. A complex signal combiner algebraically combines the in-phase and quadrature components of the spread-spectrum channels to form an in-phase (I) multi-channel spread-spectrum signal and a quadrature (Q) multi-channel spread-spectrum signal. The transmitter subsystem amplifies each signal and modulates each signal onto a carrier frequency and transmits the resultant the multi-channel spread-spectrum radio waves over a communications channel.

In the preferred embodiments, each spread-spectrum sub-channel is identified with a set of distinct-spreading codes and a set of distinct phasors. These spread-spectrum sub-channels are combined in-phase and quadrature, and the combined signals (I and Q) are spread by a cell-site specific signature-sequence for identifying users in different cells.

The invention therefore combines code-mapping with phase-modulation on the mapped codes as the basis for each spread-spectrum sub-channel. This results a multi-channel spread-spectrum system having efficient code-mapping and phase-modulation for high processing gain at the demultiplexed sub-channel data-sequence level and high spectral efficiency.

At the multi-channel spread-spectrum receiver, a translating device translates the multi-channel spread-spectrum signal from the carrier frequency to a processing frequency. A plurality of data-matched filters (MFs) embodied in a bank of joint-detectors despreads and demodulates the multi-channel spread-spectrum signal. This processing recovers a plurality of received spread-spectrum sub-channel sequences. A multiplexer recombines the plurality of received sub-channel data sequences.

Another aspect of the invention relates to the signal transmitted over the wireless air-link. The transmitted signal includes a spread-spectrum carrier wave bearing the in-phase (I) channel signal and the quadrature (Q) channel signal. The I channel signal comprises real components of the sub-channel signals, and the Q channel signal comprises imaginary components of the sub-channel signals. Each sub-channel signal comprises code sequences, which are selected from a distinct set of chip-sequence signals and phasors. The selection of the code is responsive to the m bits of each respective sub-channel data sequence, and the selection of the corresponding phasor is responsive to the k bits the respective sub-channel data sequence. Of course, the respective sub-channel data sequences comprise demultiplexed portions of the data stream, that is to say the encoded and interleaved input information in the preferred embodiments.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 5 is a diagram useful in explaining an example of the code-map.

DETAILED DESCRIPTION OF THE PRESENTLY PREFERRED EMBODIMENTS

The present invention provides a multi-channel spread-spectrum system. In the preferred embodiments, a demultiplexer or the like separates a data stream, for example from a convolutional encoder and an interleaver, into sub-channel data-sequence signals. For each sub-channel data-sequence signal, a code-map translates m bits to one code of a unique set of orthogonal chip-sequence signals. A phase-map uses the other k bits of the same sub-channel data-sequence signal to select a phasor, which is used to modulate the respective chip-sequence signal. A complex-signal combiner combines the real and imaginary components of all the phase-modulated chip-sequence signals into in-phase (I), and quadrature (Q) spread-spectrum multi-channel signals, which are spread by a cell-site specific signature-sequence, respectively. The receiver decorrelates the received spread-spectrum signal, preferably with a bank of matched filter (MF) type joint-detectors, to recover the bits from all the spread-spectrum multi-channel signals. The data recovered from the sub-channels is multiplexed into a received data stream.

Implementation of the invention in a network will involve direct sequence (code) spread spectrum but using time division to provide multiple access to the channel. In the inventive system, there will only be one user transmitting at any one time. Different users access the channel to transmit at different times, in a time division multiplexed fashion. The inventive concepts relate to the spread spectrum transmission. Those skilled in the art will understand the various techniques available for providing the time division multiple access, therefore further discussion will concentrate the inventive spread spectrum transmission.

Figure 1:
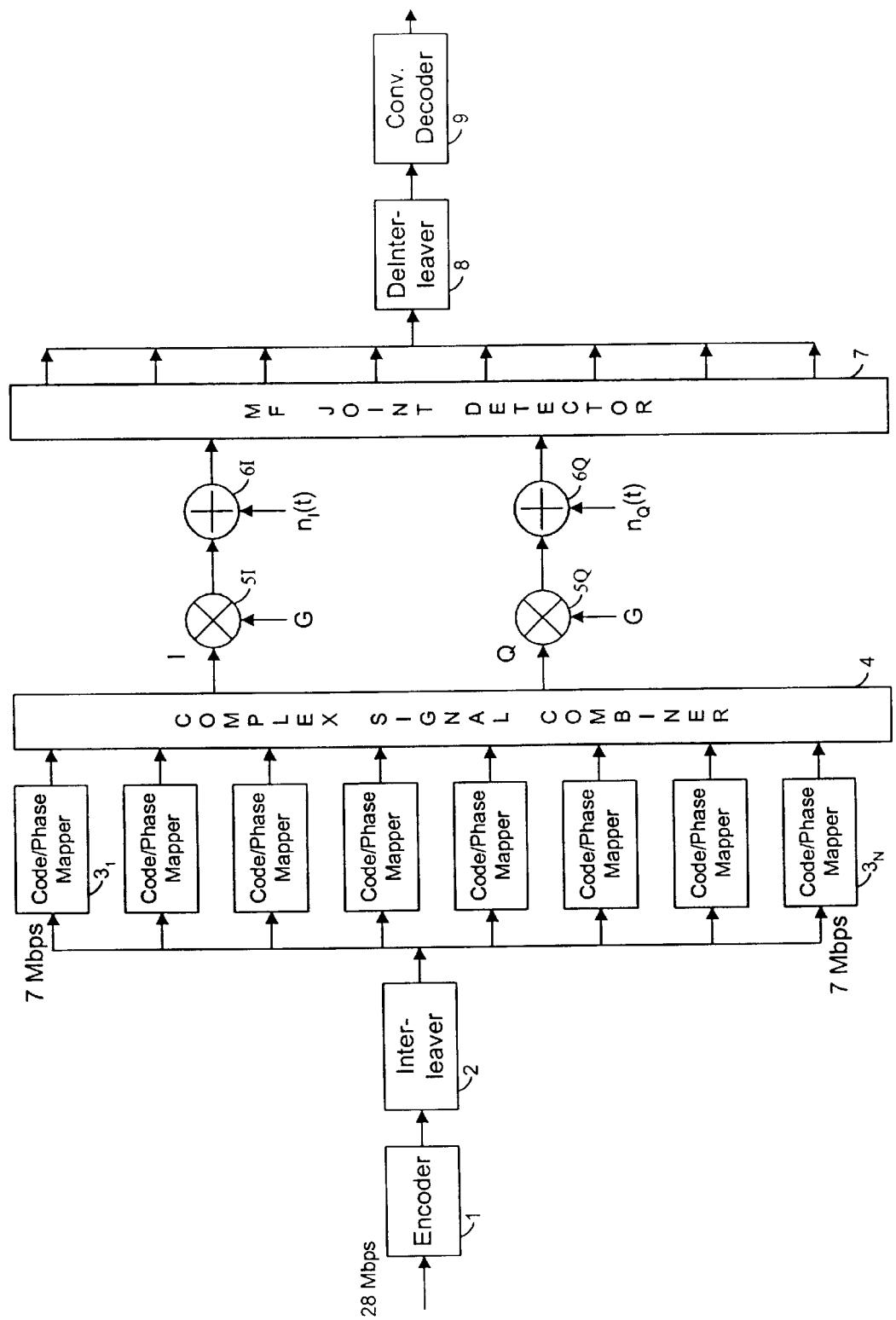
FIG. 1 is a block diagram of a multi-channel spread-spectrum system, useful in explaining certain high-level concepts involved in the invention.

Accordingly, a design of a high-speed spread-spectrum system is proposed. As it is shown in FIG. 1, encoder 1 receives input information data at 28 Mbps. The encoder 1 performs error correction encoding, for example by application of a rate-½ convolutional code. The resultant encoded data at 56 Mbps is applied to an interleaver 2. At the output of the interleaver 2, the data stream is divided into a number of sub-channel data streams. The preferred embodiments utilize 8 sub-channels, therefore the 56 Mbps interleaved and encoded data stream is split into 8 sub-channel data sequences, each at a 7 Mbps rate.

For each sub-channel, each five bits of new input data (encoded, interleaved and sub-divided) is used for mapping by a code/phase mapper 3. For N sub-channels, the transmitter would have N code/phase mappers $3_1$ to $3_N$. As noted, the preferred embodiments have 8 sub-channels, therefore the transmitter in the system shown in FIG. 1 includes 8 mappers.

Within each code/phase mapper 3, three bits of the sub-channel data are mapped onto one of 8 distinct 64-chip length orthogonal codes unique to the respective sub-channel. The other 2 data bits are mapped to one of 4 distinct QPSK phasors. Logically speaking, the QPSK phasor signal is used to modulate the spreading code output signal of the particular sub-channel. The use of 5 bits per spread sub-channel achieves a bandwidth reduction of 20%.

Each of the mappers 3 could comprise a single mapping circuit for directly mapping a 5-bit input to one of eight possible code/chip sequences having one of four possible phases. Essentially, such a mapping circuit would use one memory map-table with a 5-bit input and $2^5$ (32) possible outcomes corresponding to the phase modulated codes. As discussed below, the preferred embodiments utilize a code map circuit, a phase map circuit and a multiplier, for each sub-channel.

In any case, each mapper 3 outputs a phase-modulated chip sequence corresponding to the product of the outputs of one code map operation and the corresponding phase map operation and thereby forms the spread spectrum signal for one sub-channel. A complex signal combiner 4 algebraically combines the in-phase and quadrature components of the spread-spectrum channels to form an in-phase (I) multi-channel spread-spectrum signal and a quadrature (Q) multi-channel spread-spectrum signal.

In the preferred embodiments, each spread-spectrum sub-channel is identified with a set of distinct spreading codes and a set of distinct phasors. These spread-spectrum sub-channels are combined in-phase and quadrature, and the combined signals (I and Q) are spread by a cell-site specific signature-sequence for identifying users in different cells. For this purpose modulator 5I modulates the in-phase (I) multi-channel spread-spectrum signal by a cell-site specific signature-sequence, for example in the form of an extended Gold code sequence G. Similarly, a modulator 5Q modulates the quadrature (Q) multi-channel spread-spectrum signal by the cell-site specific signature-sequence G. The Gold codes are the signature sequences used for cell identification.

The resultant multi-channel spread-spectrum radio waves carrying the I and Q signals are transmitted over a communications channel, which results in addition of channel noise. As shown diagrammatically in FIG. 1 noise $n_I(t)$ is added to the radio wave carrying the I components at 6I; and noise $n_Q(t)$ is added to the radio wave carrying the Q components at 6Q.

At the receiver, a joint detector 7 processes the corrupted I and Q component radio wave signals to recover the data sequences from the various sub-channels. Although correlators or other types of detectors could be used, preferably, the joint detector 7 is implemented in the form of one or more matched filters (MFs). For this purpose, the MF-joint-detector 7 loads in all the spreading-code reference signals and the signature sequence as references. The MF-joint-detector 7 uses minimum mean-square-error (MMSE) algorithm to optimally detect all the sub-channel data simultaneously.

The detected signal is then parallel-to-serial converted through a multiplexer (not shown), de-interleaved, and decoded. In the illustrated example, the sub-channel data sequences are combined (at 56 Mbps in the illustrated example) and applied to a deinterleaver 8. The deinterleaver 8 reverses the interleaving performed by element 2 at the transmitter. A decoder 9 performs forward error correction (e.g. Viterbi decoding) on the stream output from the deinterleaver 8 to correct errors caused by the communication over the air-link and thus recover the original input data stream (at 28 Mbps).

This system supports constant data rate throughout the cell by maintaining large processing gain at the demultiplexed sub-channel data-sequence level, 18 dB per symbol or 11.1 dB per bit.

In a spread-spectrum system code-reuse refers to the pattern of use of codes in adjacent cells. If one cell uses all available spreading codes, and a neighboring cell uses all of the same codes, the system provides code-reuse-one. Code-reuse-two would use one set of spreading codes in a first cell and a second set of a second set of codes in the adjacent cell.

With application of the inventive transmission technique, a code-reuse-one type spread-spectrum system can be deployed in a cellular environment with the aid of power control because the transmission provides sufficient processing gain to eliminate inter-cell interference problems. Although the signature codes will vary from cell to cell, the sub-channel spreading codes are reused in adjacent cells.

Figure 7:
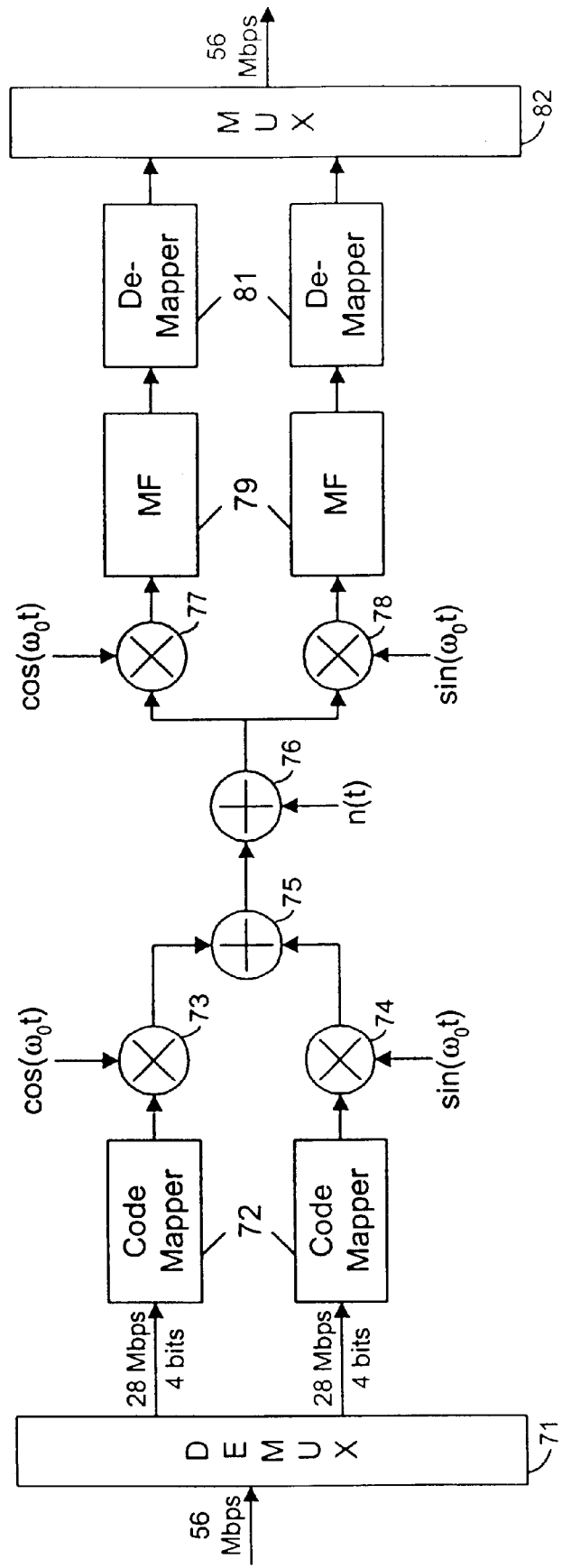
FIG. 7 is a block diagram of a conventional spread-spectrum system with code-mapping.

In the system FIG. 1, with a 5-bit data input to a 64-chip orthogonal code mapping function for each sub-channel, the baseband bandwidth occupied is 7*(64/5) or 89.6 MHz. Among the 5 bits, two are used to select the QPSK phasor, and the other 3 bits were used to select the spreading code. Thus, the transmitting system achieves a bandwidth reduction of 20%, when compared with that of a conventional spread-spectrum system with orthogonal code mapping, as shown in FIG. 7.

Reference now is made in detail to the presently preferred embodiments of the invention. Examples of those embodiments are illustrated in FIGS. 2–6 of the accompanying drawings. The present invention provides a new and novel high-speed multi-channel spread-spectrum system, which may be implemented as broadly illustrated in FIG. 2 for the transmitter section and FIG. 3 for the receiver section.

A portion (m-bits) of each data sequence is mapped to a spreading code. The resultant spread signal is modulated with a phasor selected in response to the other k bits of the data sequence. The resultant phase modulated spread spectrum signal forms one sub-channel. A "channel" is a radio frequency channel sent from the antenna of the transmitter to the antenna of the receiver. In the transmitter system of FIG. 2, the aggregate spread signal ultimately broadcast over the available bandwidth on the air-link is the channel signal and includes I and Q channels containing components of the sub-channel signals.

Figure 2:
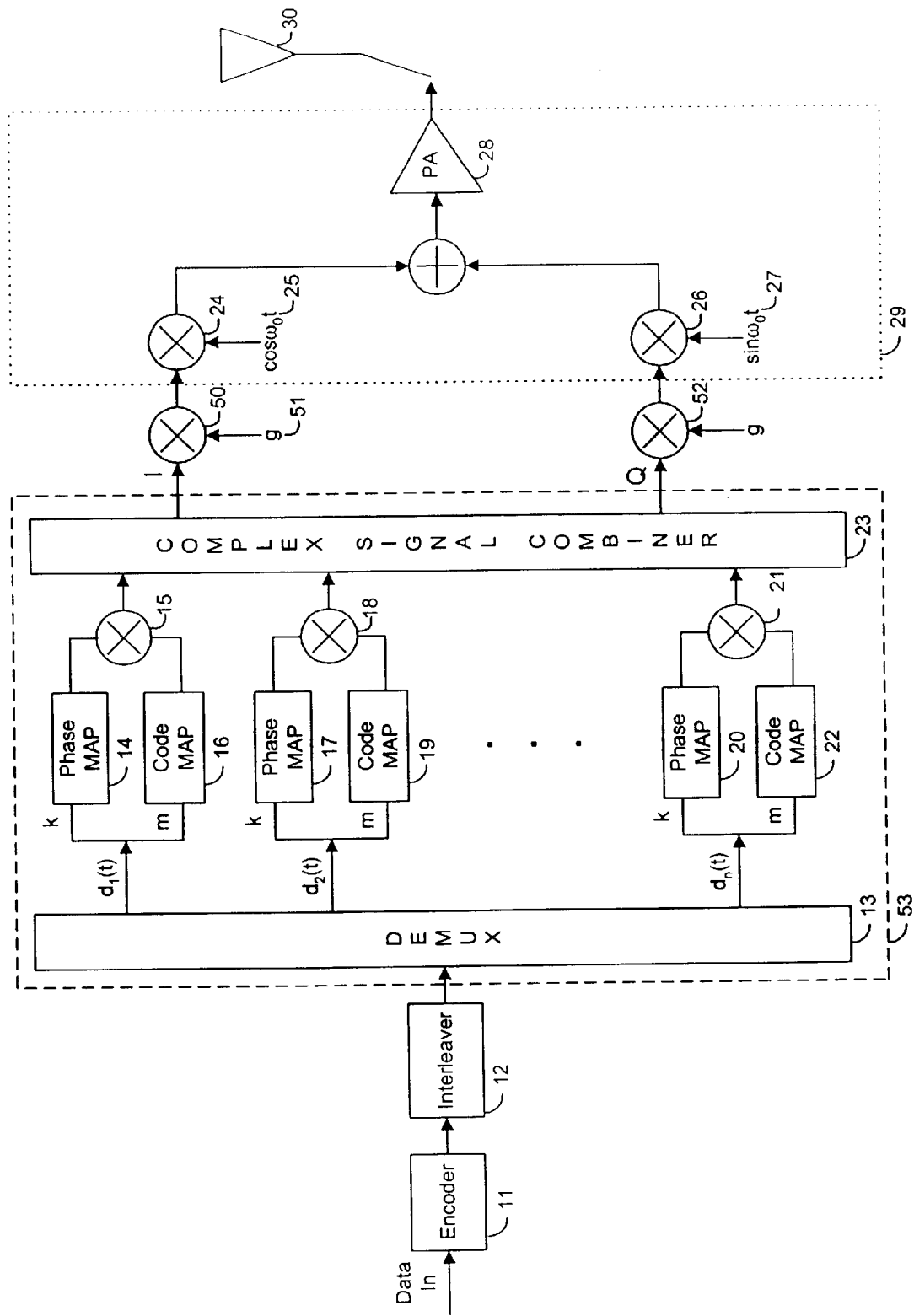
FIG. 2 is a more detailed block diagram of a transmitter section of a multi-channel spread-spectrum system implementing concepts of the present invention.

In FIG. 2, the transmitter system includes an encoder 11, which receives the input data intended for communication over the channel. The encoder 11 may be a forward-error-correction (FEC) code device of a type well known in the art, such as a convolutional encoder, for correcting data bit errors when multi-channel spread-spectrum data signal is corrupted as communicated over the transmission medium. The encoder 11 supplies the data, with the added forward error correction coding to an interleaver 12. The interleaver 12 may be a buffer device, for rearranging the data from the encoder 11. Interleavers are well known in the art for rearranging the bits in a stream to thereby randomize any errors that may be caused by the transmission medium.

The spread-spectrum means is embodied as a multi-channel spread-spectrum modulator subsystem 53, which may include a demultiplexer 13, a plurality of code-maps 16, 19 and 22, a plurality of phase-maps 14, 17 and 20, and a plurality of product devices 15, 18, and 21.

The interleaver 12 supplies the resultant bit stream to the demultiplexer (DeMux) 13. The demultiplexer 13 outputs n sub-channel data sequences. The demultiplexer 13 has a plurality of outputs, with each output having one demultiplexed portion d(t) of the encoded and interleaved signal. Essentially, the demultiplexer applies the first x (x=k+m), number of bits to its first ouptut $d_1(t)$; the demultiplexer applies the next x number of bits to its second ouptut $d_2(t)$; etc., until the demultiplexer applies the x bits to its nth output $d_n(t)$. Then the demultiplexer 13 recycles back and ouptuts the next x bits to its first output $d_1(t)$; and so on.

Assuming again a 28 Mbps input data stream encoded by application of a rate-½ convolutional code, the demultiplexer 13 preferably splits the 56 Mbps encoded and interleaved signal into eight 7 Mbps sub-channel data sequences in 5-bit increments.

If there are n sub-channels, the transmitter includes n phase map circuits and n code map circuits, with one phase map circuit and a code map circuit for processing each x bits from a respect sub-channel data stream d(t). In the illustrated example, the bits of the first sub-channel data sequence $d_1(t)$ are processed by the phase map circuit 14 and the code map circuit 16. Similarly, the bits of the second sub-channel data sequence $d_2(t)$ are processed by the phase second map circuit 17 and the code map circuit 19. Similar mapping circuits are provided for the other sub-channels; and the bits of the nth sub-channel data sequence $d_n(t)$ are processed by the phase map circuit 20 and the code map circuit 22.

Each of the phase-map circuits 14, 17, and up to 20, may comprise a processor and memory and associated output circuitry for mapping a k-bit data stream to a phasor output signal. A phasor is a complex number having a real part and an imaginary part.

Figure 4:
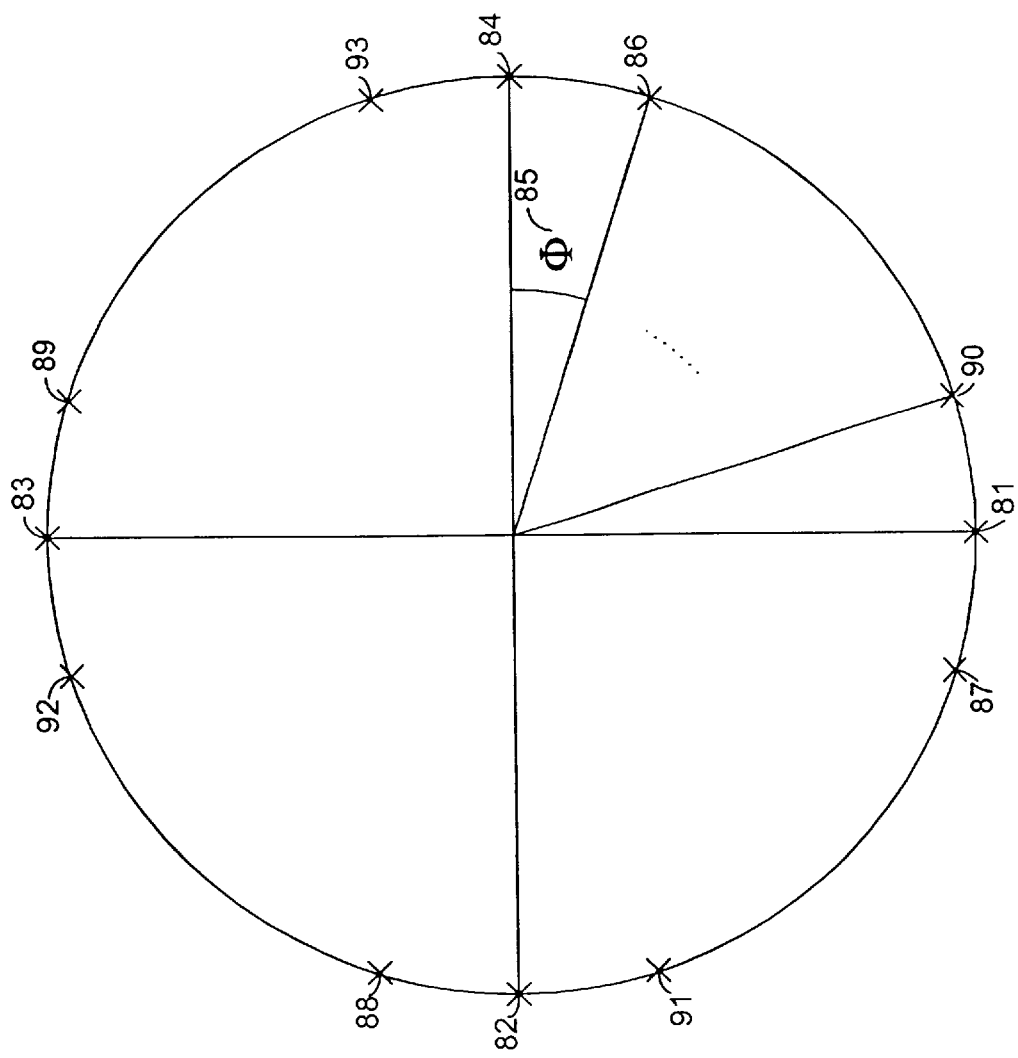
FIG. 4 is a diagram of a phase-map.

A preferred phase map circuit 14 maps each 2 bits of a 7 Mbps sub-channel data sequence $d_1(t)$ to one of a distinct set of 4 phasors, such as one of the phasors 81, 82, 83, and 84 illustrated in FIG. 4. The phasor 84 would have a real value of 1 and an imaginary part value of 0, whereas the phasor 81 would have an imaginary value of −1 and a real value of 0. The phasor 82 would have a real value of −1 and an imaginary part value of 0, whereas the phasor 83 would have an imaginary value of 1 and a real value of 0. A second phase-map circuit 17 maps a different k-bit data stream from $d_2(t)$ to one of four phasors 86, 87, 88, and 89 by rotating an phase angle φ85 from the previous set of phasors. The last k-bit data stream from $d_n(t)$ may be mapped to one of the phasors 90, 91, 92, and 93, which are rotated by an angle of (n−1)φ from the set of phasors 81, 82, 83, and 84, where n is the demultiplexing factor.

Alternatively, the phase mapping circuits may utilize any convenient multi-level modulation technique, which may be in the form of quadrature-amplitude modulation as is well known in the art to be capable of compressing data signal bandwidth.

Each of the code-map circuits 16, 19, and up to 22 may comprise a processor, memory and associated output circuitry for mapping each m-bits of a sub-channel data stream to one of $2_m$ $n2^m$-chip length orthogonal chip-sequence signals, as illustrated in FIG. 5. The code-mapping rule 94, which may be embodied as selecting a set of $n2^m$-chip length orthogonal chip-sequence signals for a m-bit data stream. Each m data bits from the sub-channel data sequence $d_1(t)$, from the demultiplexer 13, may be mapped to a set of orthogonal chip-sequence signals as embodied in the code set 95. Similarly, each m data bits from the sub-channel data sequence $d_2(t)$ from the demultiplexer 13 may be mapped to a different set, set 96, of orthogonal chip-sequence signals. The last m data bits from the demultiplexer 13 of outputted $d_n(t)$ may be mapped to a set 97 of still different orthogonal chip-sequence signals. The preferred code-mapping rule 94 requires that all of the chip-sequence signals, from all the sets, be mutually orthogonal to each other.

The code-mapping rule 94 is preferred. However, it is within the scope of the invention to utilize any other code mapping rule capable of outputting a plurality of orthogonal chip-sequence signals satisfying the orthogonal chip-sequence requirement for the desired number of sub-channels.

In the preferred embodiment, there are eight of the code mappers 16, 19 and up to 22, one for each of the eight sub-channels. Since each 5 bits of sub-channel data are mapped, and 2-bits used for the phase mapping, three bits of the sub-channel data are mapped onto one of 8 distinct 64-chip length orthogonal code sequences. Since there preferably are eight sub-channels, the system uses 64 different codes for spreading the sub-channel data sequences. When a mapping circuit selects a code, it selects a 64-chip long code sequence in accord with the mapping of the input bits.

For each respective sub-channel a multiplier receives the outputs from the two respective sub-channel mapping circuits. The illustrated embodiment includes product devices 15, 18, and so forth up to 21. Thus for each x bits of sub-channel input data $d_1(t)$, the product device 15 multiplies the code sequence selected by the m-bit code map circuit 16 by the phasor selected by the k-bit phase map circuit 14, to form the spread spectrum signal for the first sub-channel. The phasor has real and imaginary components, and the multiplication serves to adjust the phase of the code sequence in accord with those components.

In a similar manner, the product device 18 multiplies each code sequence selected by the code map circuit 19 by the phasor selected by the phase map circuit 17, to form the spread spectrum signal for the second sub-channel. Similar devices perform the same functions for the other sub-channel; and so the product device 21 multiplies code sequences from selected by the code map circuit 22 by the corresponding phasors selected by the phase map circuit 20, to form the signal for the nth sub-channel.

The transmitter system of FIG. 2 also includes a complex signal combiner 23 coupled to outputs of the product devices 15, 18, 21. The complex signal combiner 23 algebraically combines the real or in-phase components of the spread-spectrum sub-channels from the product devices, to form an in-phase (I) multi-channel spread-spectrum signal. The complex signal combiner 23 algebraically combines the imaginary or quadrature components to form a quadrature (Q) multi-channel spread-spectrum signal. Hence, there are components of all of the individual sub-channels contained within the I channel signal and components of all of the individual sub-channels contained within the Q channel signal.

The transmitter subsystem preferably includes multiplier devices 50 and 52, for modulating the multi-channel spread-spectrum signals by a cell-site specific signature sequence 51, such as an extended Gold code (g). Multipliers 24, 26 modulate carrier-frequency signals 25, 27 generated by a local oscillator to shift the complex signals to a radio frequency. Specifically, multiplier 24 modulates the spread spectrum signal from multiplier 50 with the local oscillator signal $\cos(\omega_0 t)$ 25; and the multiplier 26 modulates the spread spectrum signal from multiplier 52 with the local oscillator signal $\sin(\omega_0 t)$. The two local oscillator signals have the same frequency but are shifted 90° apart in phase. The transmitter section 29 includes a summing junction and a power amplifier 28 and/or other circuitry as is well known in the art for transmitting the combined signal over a communications channel via an antenna 30.

The code maps 16, 19, 22 serve to distinguish data from many spread-spectrum sub-channels in a wide-band spread-spectrum time-division multiple-access system (WSS/TDMA). There is only one user transmitting in a cell at any instant of time, and the identification of a user's information is contained in a header of the multi-channel spread-spectrum signal transmitted, as is understood in the art. Within each cell, a particular spread-spectrum sub-channel is identified by the orthogonal chip-sequence signal that was used to spread-spectrum process the particular sub-channel data-sequence signal. The multi-channel spread-spectrum transmission mechanism increases system spectral efficiency, and at the same time maintains high processing gain at the demultiplexed sub-channel data sequence level.

By spreading each multi-channel spread-spectrum signal with a cell-site specific signature-sequence g, as embodied in the transmitter subsystem 29, the same sets of orthogonal chip-sequence signals for the sub-channels can be used by all users in every other cell. This reduces the cost of having matched filters or correlators tailored to each specific user in a cell or at a different cell. The difference in the codes used by any two neighboring cells is the cell signature sequence.

The signal actually transmitted over the wireless air-link therefore includes a spread-spectrum carrier wave bearing the in-phase (I) channel signal and the quadrature (Q) channel signal. The I channel signal comprises real components of the sub-channel signals, and the Q channel signal comprises imaginary components of the sub-channel signals. Each sub-channel signal comprises code sequences, which are selected from a distinct set of chip-sequence signals and phase modulated. The selection of the code is responsive to the m-bits of each respective sub-channel data sequence, and the selection of the corresponding phasor is responsive to the k-bits of the respective sub-channel data sequence. Of course, the respective sub-channel data sequences comprise demultiplexed portions of the data stream, that is to say the encoded and interleaved input information in the preferred embodiments.

Figure 3:
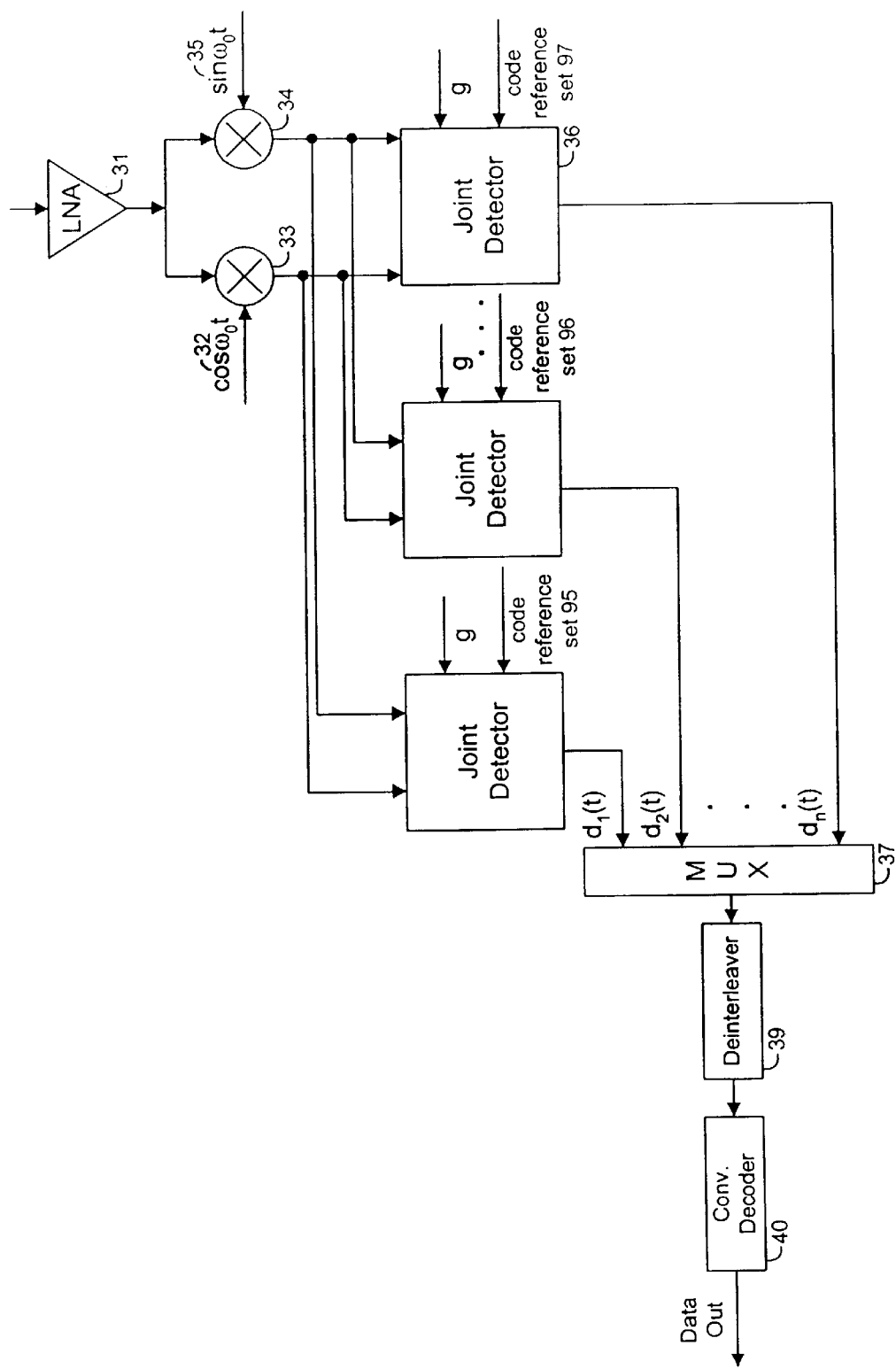
FIG. 3 is a more detailed block diagram of a receiver section of a multi-channel spread-spectrum system implementing concepts of the present invention.

To insure an adequate understanding of the concepts of the invention, it may be helpful to consider the high-level functionality required to receive and process a signal transmitted in accord with the inventive concepts. FIG. 3 therefore provides a high-level functional block diagram of one possible implementation of a receiver for operation with the transmitter system of FIG. 2.

A low noise amplifier (LNA) 31 receives and amplifies the over-the-air channel signal from a receiving antenna (not shown). The LNA amplifier 31 supplies the channel signal to two translating devices 33 and 34. One or more local oscillators generate proper carrier-frequency signals 32 and 35 and supply a $\cos(\omega_0 t)$ signal 32 to the device 33 and a $\sin(\omega_0 t)$ signal 35 to the device 34. The translating device 33 multiplies the amplified over-the-air channel signal by the $\cos(\omega_0 t)$ signal 32; and the translating device 34 multiplies the amplified over-the-air channel signal by the $\sin(\omega_0 t)$ signal 35. The translating devices 33 and 34 translate the received multi-channel spread-spectrum signal from the carrier frequency to a processing frequency.

The receiver includes means for essentially reversing the spread of the received signals or "despreading" the received spread-spectrum signals. In the illustrated embodiment of the receiver, this function is embodied in a bank of matched-filer (MF) joint-detectors 36. Essentially, there are n joint detectors, that is to say one for each of the sub-channels.

Each joint-detector 36 jointly detects the spreading code sequence and the phasor in the respective spread-spectrum sub-channel. Each joint-detector 36 receives the baseband signals corresponding to the I and Q signals modulated with the cell-specific cover code. As such, each joint-detector 36 receives both the real components and the imaginary components. The joint-detector 36 for one sub-channel detects codes and phases, and it de-maps the detected spreading code sequences and the detected phasors, and multiplexes the recovered bits of data back into a detected sub-channel data-sequence signal for that sub-channel. The joint-detector 36 can utilize any form of detection scheme.

A preferred implementation comprises a plurality of matched filter receivers coupled with a phase-slicer, capable of detecting the spread-spectrum code sequence signal and the associated phase signal. A detector for a particular sub-channel receives a reference set of codes including the $2^m$ spreading codes used for the particular sub-channel and the cover code for the cell.

Figure 6:
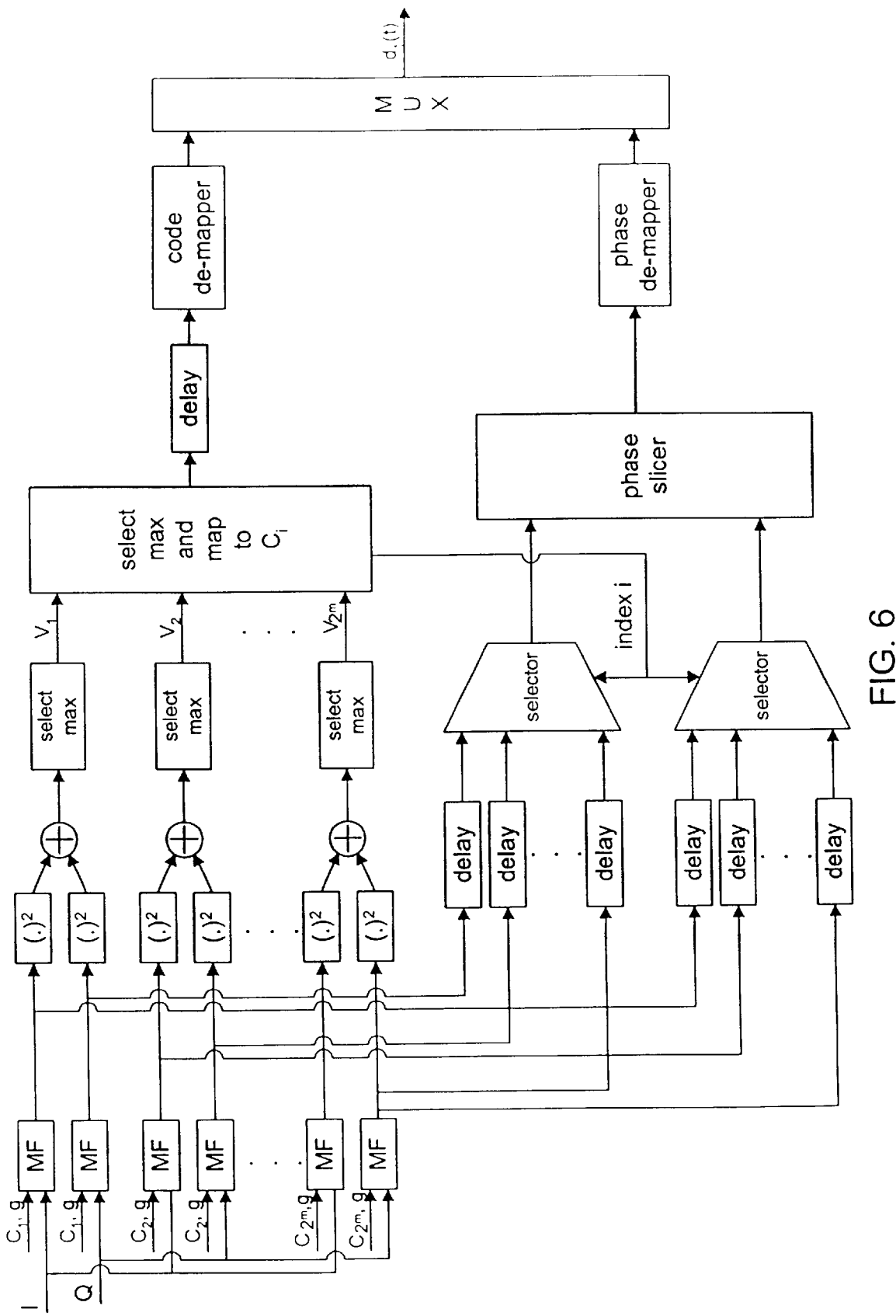
FIG. 6 is a high-level, functional block diagram of a matched filter (MF) implementation of one of the joint-detectors used in the receiver of FIG. 3.

FIG. 6 depicts one example of a suitable joint-detector for detecting sub-channel data-sequence $d_1(t)$. The illustrated detector comprises a plurality of matched filter (MF) receivers. The code reference set 95 (see FIG. 5) and the cell-site specific signature sequence g are input to a plurality of matched filters (MF). The output of each pair of MF receivers, from the I-channel and Q-channel, is squared and summed. The maximum of the summer output is selected over a spreading symbol duration as $V_1$. Similarly, $V_2$ and up to $V_2^m$ are obtained in the same fashion. The select-max-and-map-to-$C_i$ block selects the maximum of its inputs and maps to the respective spreading sequence $C_i$. The detected code sequence $C_i$ is delayed by a symbol period and de-mapped to the m bits of the sub-channel data-sequence signal $d_1(t)$. The select-max-and-map-to-$C_i$ block also outputs the index number i, which corresponds to the maximum input value $V_i$. Each selector selects the i-th input from the one-symbol-time delayed version of the MF outputs, and outputs to the phase-slicer block. The phase demapper maps the received phase signal to the corresponding k data bits. The detected data bits from the code demapper and phase demapper are then multiplexed as the demodulated sub-channel data-sequence signal $d_1(t)$.

Similar joint-detectors are used for the other channels, except that the other detectors receive different reference codes. For example, the joint-detector for detecting sub-channel data-sequence $d_2(t)$ uses the code reference set 96; whereas the joint-detector for detecting sub-channel data-sequence $d_n(t)$ uses the code reference set 97. All detectors use the same cover code for communications within a specific cell. In this manner, the matched filters (MF) in each respective detector recover the chip sequence in appropriate phase relation for the respective sub-channel, and the other processing elements can recover the code mapped data bits and the phase mapped data bits to reconstruct the respective sub-channel data stream $d(t)$.

Returning to FIG. 3, the receiver system further includes a multiplexer (Mux) 37, a deinterleaver 39 and a decoder 40. The decoder 40 may be a convolutional decoder. The multiplexer 37 combines the detected sub-channel spread-spectrum data sequences together to form the received-interleaved data. The received-interleaved data is de-interleaved by a de-interleaver 39, and then decoded by a convolutional decoder 40 to produce a received data stream essentially corresponding to the original data that was input for communication at the transmitter.

Aspects of the invention also relate to a methodology for communicating digital information. The preferred method includes encoding the data and interleaving the data. The interleaved data are demultiplexed or segregated using a demultiplexer, into a predetermined number of sub-channel data sequence signals. The method includes generating a plurality of phasors and a plurality of orthogonal chip-sequence signals responsive to the sub-channel data sequences. Each of the orthogonal chip-sequence signals is modulated by a respective phasor, to form a phase-modulated spread-spectrum signal for a respective sub-channel.

On the transmit-side, the method involves a complex signal combination of the spread-spectrum sub-channels to form a multi-channel spread-spectrum signal. The multi-channel spread-spectrum signal is transmitted on a carrier frequency over a communications channel using radio waves.

On the receive-side, the methodology includes translating a received version of the multi-channel spread-spectrum signal from the carrier frequency to a processing frequency. Any header embedded in the multi-channel spread-spectrum signal may be detected. At the processing frequency, the steps include despreading the multi-channel spread-spectrum signal to obtain a plurality of received spread-spectrum sub-channel data streams. These data stream are multiplexed to obtain the received-interleaved data. The steps include de-interleaving and decoding the received-interleaved data, to obtain the actual received data.

In the preferred embodiments, the multi-channel spread-spectrum system is a WSS/TDMA system, capable of transmitting, in a particular application, 28 megabits per second of data. For example, the following discussion assumes operation in the frequency band 6 GHz. Preferred bandwidth is 100 MHz in the UNII band.

In order to achieve a high processing gain at this bandwidth the data are demultiplexed. In FIG. 2, 89.6 megachips per second and a demultiplex-factor, n, of eight is employed for 100 MHz bandwidth operation. Applying the methodology to a specific example of a system using the circuitry of FIGS. 1, 2 and 3 would result in an operation as follows:

1. There may be 2(k=2) bits from each of the 8 (n=8) sub-channel data-sequences for phase mapping, and 3 (m=3) bits for orthogonal chip-sequence mapping. The 64-chip length orthogonal chip-sequences can be generated by a Hadamard matrix or by any other means. Techniques for generating orthogonal chip-sequences are well known in the art.

A 64-chip length signature-sequence can be generated from a PN-sequence generator or an extended Gold code generator. Techniques for generating a signature-sequence with good correlation properties are well known in the art. The composite spreading sequence signal set from the spreading code exclusive-or gated with a cell-site specific signature-sequence is mutually orthogonal to each other in a cell. Preferably, the cross-correlation of the composite chip-sequence signal sets should have maximum minimum-Hamming-distance between any two neighboring cells.

2. An encoder 11 encodes the data, for example, using a rate-½ convolutional code. The encoded data are interleaved and then demultiplexed into eight, 56/8=7 megabits per second sub-channel data-sequence signals.

3. Each 5-bit symbol from the sub-channel data-sequence is spread by a 64-chip orthogonal chip-sequence with 3 bits for spreading-code mapping. The other 2 bits are used for QPSK phase-mapping and modulation of the chip-sequence, to form a product signal as a phase-modulated spread-spectrum signal. The processing gain at the demultiplexed sub-channel data-sequence level is 12.8 dB per 5-bit symbol or 11.1 dB per bit. The orthogonal chip-sequence signals are each orthogonal to one another.

4. Each user has the same set of orthogonal chip-sequence signals in a cell.

5. The spread data is modulated with a cell-site specific signature-sequence, and then the signal is upconverted and amplified by transmitter subsystem 29 and transmitted over the air-link.

6. The received signal is amplified in a low noise amplifier (LNA) 31 and down-converted, by mixers 33 and 34 with carrier-frequency reference signals 32 and 35 from a local oscillator, to baseband.

7. Finally, the received signal is detected by a plurality of joint-detectors 36. The detected data is then multiplexed by multiplexer 37 and de-interleaved by de-interleaver 39, and decoded by decoder 40 to recover the 28 Mbps information stream.

In each of the above-discussed examples, there was essentially one transmitter sending to one receiver. The actual application of the invention may involve multicasting to multiple receivers. A preferred network, however, would include a number of cell-site base stations connected to a broadband packet network.

Each base station would include a transmitter and a receiver utilizing cell-site specific cover codes. A number of mobile stations would communicate with each base station. Within each cell, the mobile stations would access the air-link in a time division manner, utilizing the transmission technique in accord with the invention and/or the disclosed examples. In a similar fashion, the cell site base station would transmit to each mobile station on a time division basis, using the inventive transmission technique.

In any two-way communication network, all stations would include a transmitter and a receiver of the types disclosed in the case. For example, both the base stations and the mobile stations in the cellular network would include a transmitter, such as that shown in FIG. 2, and a receiver such as disclosed with regard to FIGS. 3 and 6.

Those skilled in the art will understand that the inventive concepts may be modified and adapted to a wide range of other communication applications, for example to transport data at different rates and/or using different numbers of sub-channels.

While the foregoing has described what are considered to be best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the invention.

What is claimed is:

1. A multi-channel spread-spectrum modulator subsystem, comprising:
   a demultiplexer for demultiplexing a representation of an input data stream into a plurality of sub-channel data-sequence signals;
   a plurality of mapping circuits, one of which is coupled to receive each respective sub-channel data-sequence signal from the demultiplexer, wherein each mapping circuit is for mapping predetermined-length segments of the respective sub-channel data-sequence signal to generate a respective phase modulated spread-spectrum sub-channel signal,
   each phase modulated spread-spectrum sub-channel signal comprising orthogonal spreading-codes selected in response to mapping of first predetermined bits of the segments of the respective sub-channel data-sequence signal, the selected orthogonal spreading-codes being modulated with phasors selected in response to mapping of second predetermined bits of the segments of the respective sub-channel data-sequence signal; and
   a signal combiner for receiving the respective spread-spectrum sub-channel signals from the mapping circuits for transmission.

2. A multi-channel spread-spectrum modulator subsystem, comprising:
   a demultiplexer for demultiplexing a representation of an input data stream into a plurality of sub-channel data-sequence signals;
   a plurality of mapping circuits, one of which is coupled to receive each respective sub-channel data-sequence signal from the demultiplexer, wherein each mapping circuit is for mapping predetermined-length segments of the respective sub-channel data-sequence signal to generate a respective phase modulated spread-spectrum sub-channel signal, each of the mapping circuits comprising:
      (a) a code-mapping circuit for mapping a predetermined m-bits of each segment of the respective sub-channel data sequence signal to a selected one of a unique plurality of orthogonal spreading-codes;
      (b) a phase-mapping circuit for mapping a remaining k-bits of each segment of the respective sub-channel data-sequence signal to a selected one of a plurality of distinct phasor signals; and
      (c) a product device for modulating each selected code sequence from the code-mapping circuit with a corresponding selected phasor signal from the phase-mapping circuit, to generate the respective spread-spectrum sub-channel signal; and
   a signal combiner for receiving the respective spread-spectrum sub-channel signals from the mapping circuits for transmission.

3. A multi-channel spread-spectrum modulator subsystem as in claim 1, wherein the signal combiner comprises a complex signal combiner for algebraically combining the plurality of spread-spectrum sub-channel signals as an in-phase multi-channel spread-spectrum signal and a quadrature multi-channel spread-spectrum signal for transmission.

4. A multi-channel spread-spectrum modulator subsystem, comprising:
   a demultiplexer for demultiplexing a representation of an input data stream into a plurality of sub-channel data-sequence signals and supplying each respective sub-channel data-sequence signal to a respective output of the demultiplexer;
   code-mapping circuits, wherein a respective code-mapping circuit is coupled to each respective output of the demultiplexer, each code-mapping circuit for mapping predetermined m-bit segments of the respective sub-channel data-sequence signal to a plurality of orthogonal spreading-codes;
   phase-mapping circuits, wherein a respective phase-mapping circuit is coupled to each respective output of the demultiplexer, each phase-mapping circuit for mapping predetermined k-bit segments of the respective sub-channel data-sequence signal to a plurality of distinct phasor signals;
   product devices, wherein a respective product device is for modulating each code sequence output of a respective code-mapping circuit with a corresponding phasor signal output from a respective phase-mapping circuit to generate a spread-spectrum sub-channel signal;
   a complex signal combiner, receiving the spread-spectrum sub-channel signals from the product devices, for algebraically combining the plurality of spread-spectrum sub-channel signals to form an in-phase multi-channel spread-spectrum signal and a quadrature multi-channel spread-spectrum signal for transmission.

5. A multi-channel spread-spectrum modulator subsystem as in claim 4, further comprising:
an encoder for receiving and encoding input digital information;
an interleaver, coupled to the encoder and the demultiplexer, for receiving and interleaving the encoded digital information to form the representation of the input data stream for input to the demultiplexer.

6. A multi-channel spread-spectrum modulator subsystem as claim 4, wherein each respective code-mapping circuit maps m-bit segments to a distinct set of orthogonal spreading-codes.

7. A multi-channel spread-spectrum modulator subsystem as in claim 6, wherein: for n sub-channels, each distinct set of orthogonal spreading-codes comprises $2^m$ orthogonal spreading-code sequences of $n2^m$ chip-length.

8. A multi-channel spread-spectrum modulator subsystem as in claim 6, wherein each respective phase-mapping circuit maps k-bit segments to a distinct set of phasors.

9. A multi-channel spread-spectrum modulator subsystem as in claim 4, wherein each respective phase mapping circuit maps k-bit segments to a distinct set of phasors.

10. A multi-channel spread-spectrum modulator subsystem as in claim 9, wherein for n respective sub-channel data-sequence signals, each phase mapping circuit for a respective sub-channel data-sequence signal maps k-bit segments to a phase angle set of $2^k$ distinct phasors, each phasor of which is offset by a phase angle $\phi$ from a corresponding phasor of the phase angle set used by another of the phase mapping circuits.

11. A multi-channel spread-spectrum modulator subsystem as in claim 4, further comprising a transmitter coupled to the complex signal combiner, for transmission of the in-phase multi-channel spread-spectrum signal and the quadrature multi-channel spread-spectrum signal over a channel.

12. A multi-channel spread-spectrum modulator subsystem as in claim 11, wherein the transmitter comprises:
a first spread-spectrum modulator for modulating the in-phase multi-channel spread-spectrum signal with a cell-site specific orthogonal cover code; and
a second spread-spectrum modulator for modulating the quadrature multi-channel spread-spectrum signal with the orthogonal cover code.

13. A multi-channel spread-spectrum modulator subsystem as in claim 12, wherein the transmitter further comprises:
a first multiplier for multiplying an output signal from the first spread-spectrum modulator by a carrier wave of a predetermined frequency and having a first phase; and
a second multiplier for multiplying an output signal from the second spread-spectrum modulator by a carrier wave of the predetermined frequency and having a second phase different from the first phase.

14. A method of transmitting an information data stream comprising:
separating the information data stream into a plurality of respective sub-channel data streams;
code-mapping predetermined m-bit segments of each respective sub-channel data-sequence signal to a plurality of orthogonal spreading-codes;
phase-mapping k-bit segments of each respective sub-channel data-sequence signal to a plurality of distinct phasor signals;
for each of the sub-channels, multiplying respective orthogonal spreading-codes with corresponding phasor signals to form a respective sub-channel spread-spectrum signal;
combining all of the sub-channel spread-spectrum signals to form at least one combined signal;
modulating the at least one combined signal with a cell-site specific cover code to form a spread-spectrum channel signal; and
transmitting the spread-spectrum channel signal over a wireless air-link.

15. A method as in claim 14, wherein the code-mapping step comprises mapping segments of each respective sub-channel data-sequence signal to a different plurality of the orthogonal spreading-codes.

16. A method as in claim 15, wherein if there are n sub-channels, each different plurality of the orthogonal spreading-codes comprises $2_m$ orthogonal spreading-code sequences of $n2^m$ chip-length.

17. A method as in claim 14, wherein the phase-mapping step comprises mapping segments of each respective sub-channel data-sequence signal to a different plurality of the distinct phasor signals.

18. A method as in claim 17, wherein if there are n sub-channels, each different plurality of the distinct phasor signals comprises a phase angle set of $2^k$ distinct phasors, each phasor of which is rotated by a phase angle $\phi$ from a phasor of an adjacent phase angle set used for another sub-channel.

19. A method as in claim 14, further comprising:
encoding input digital information for forward error correction; and
interleaving the encoded digital information to form the information data stream.

20. A communication system, comprising:
a transmitter system, comprising:
1) a demultiplexer for demultiplexing a representation of an input data stream into a plurality of sub-channel data-sequence signals and supplying each respective sub-channel data-sequence signal to a respective output of the demultiplexer;
2) code-mapping circuits, wherein a respective code-mapping circuit is coupled to each respective output of the demultiplexer, each code-mapping circuit for mapping predetermined m-bit segments of the respective sub-channel data-sequence signal to a plurality of orthogonal spreading-codes;
3) phase-mapping circuits, wherein a respective phase-mapping circuit is coupled to each respective output of the demultiplexer, each phase-mapping circuit for mapping predetermined k-bit segments of the respective sub-channel data-sequence signal to a plurality of distinct phasor signals;
4) product devices, wherein a respective product device is for modulating each code sequence output from a respective code-mapping circuit with a corresponding phasor signal output from a respective phase-mapping circuit to generate a spread-spectrum channel signal;
5) a complex signal combiner, receiving the spread-spectrum channel signals from the product devices, for algebraically combining the plurality of spread-spectrum channels to form an in-phase multi-channel spread-spectrum signal and a quadrature multi-channel spread-spectrum signal; and 6) a modulator for modulating the in-phase multi-channel spread-spectrum signal and a quadrature multi-channel spread-spectrum signal and transmitting the modulated signals over a wireless air-link; and a receiver system, for receiving and processing the modulated signals over the wireless air-link to recover the input data stream.

21. A communication system as in claim 20, wherein the transmitter system further comprises:

an encoder for receiving and encoding input digital information;

an interleaver, coupled to the encoder and the demultiplexer, for receiving and interleaving encoded digital information to form the representation of an input data stream for input to the demultiplexer.

22. A communication system as in claim 20, wherein the modulator comprises:

a first spread-spectrum modulator for modulating the in-phase multi-channel spread-spectrum signal with a cell-site specific orthogonal cover code; and a second spread-spectrum modulator for modulating the quadrature multi-channel spread-spectrum signal with the orthogonal cover code.

23. A communication system as in claim 22, wherein the modulator further comprises:

a first multiplier for multiplying an output signal from the first spread-spectrum modulator by a carrier wave of a predetermined frequency and having a first phase; and a second multiplier for multiplying an output signal from the second spread-spectrum modulator by a carrier wave of the predetermined frequency and having a second phase different from the first phase.

* * * * *